(12) United States Patent  
Vogt

(10) Patent No.: US 7,497,497 B2
(45) Date of Patent: Mar. 3, 2009

(54) COVER FOR CLOSING A RECEIVING SPACE IN THE BODYWORK OF A VEHICLE

(75) Inventor: Dirk Vogt, Stuttgart (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 12/039,001

(22) Filed: Feb. 28, 2008

(65) Prior Publication Data

US 2008/0203771 A1 Aug. 28, 2008

(30) Foreign Application Priority Data

Feb. 28, 2007 (DE) .................. 10 2007 009 669

(51) Int. Cl.
*B60J 7/20* (2006.01)

(52) U.S. Cl. .................. 296/107.08; 296/136.05
(58) Field of Classification Search ............ 296/136.05, 296/136.06, 107.08, 76
See application file for complete search history.

(56) References Cited

U.S. PATENT DOCUMENTS

| 5,823,606 | A | 10/1998 | Schenk et al. |
| 6,092,335 | A | 7/2000 | Queveau et al. |
| 7,032,952 | B2 * | 4/2006 | Dilluvio ................. 296/107.08 |
| 7,204,542 | B2 * | 4/2007 | Queveau et al. ........ 296/107.08 |
| 2004/0222658 | A1 * | 11/2004 | Dilluvio ................ 296/107.08 |
| 2006/0186694 | A1 * | 8/2006 | Wagner ................. 296/107.08 |

* cited by examiner

*Primary Examiner*—Joseph D Pape
(74) *Attorney, Agent, or Firm*—Brooks Kushman P.C.

(57) ABSTRACT

A vehicle trunk cover assembly includes two coupled guide rod units which are connectable to the cover and the vehicle body such that the cover is movable between a closed position covering the trunk, a roof transport position in which the front cover end is lifted relative to the trunk, and a loading position in which the rear cover end is lifted relative to the trunk. A locking lever connectable to the vehicle body includes a lock which is movable from an engaged position to a disengaged position upon being actuated. One guide rod unit cooperates with the lock such that the guide rod unit engages the lock when the lock is in its engaged position so that the cover may move into its loading position and disengages from the lock when the lock is in its disengaged position so that the cover may move into its roof transport position.

15 Claims, 2 Drawing Sheets

COVER FOR CLOSING A RECEIVING SPACE IN THE BODYWORK OF A VEHICLE

CROSS-REFERENCE TO RELATED APPLICATIONS

This application claims foreign priority benefits under 35 U.S.C. §119(a)-(d) to DE 10 2007 009 669.2, filed Feb. 28, 2007, which is hereby incorporated by reference in its entirety.

BACKGROUND OF THE INVENTION

1. Field of the Invention

The present invention relates to a cover for a receiving space such as a trunk or a storage compartment in a vehicle body.

2. Background Art

EP 0 949 104 A1 (corresponds to U.S. Pat. No. 6,092,335) describes a vehicle having a collapsible roof movable between a closed position in which the roof extends over the vehicle passenger compartment and an opened position in which the roof is stored in the trunk of the vehicle. The front end of a cover covering the trunk is lifted to swivel the cover about an axis in the rear of the vehicle to allow the roof to move in and out of the trunk. The rear end of the cover is lifted to swivel the cover about an axis next to the rear of the roof when the roof is closed to allow items to be loaded into and unloaded out of the trunk.

DE 699 00 921 T2 (corresponds to U.S. Pat. No. 6,092,335) describes a vehicle having a folding roof movable between the closed position and an opened position in which the roof is stored in a storage compartment of the vehicle. A cover covering the compartment is movable into positions which either allow the roof to be stored in the compartment or allow access to the compartment from the rear vehicle side.

DE 44 45 944 C1 (corresponds to U.S. Pat. No. 5,823,606) describes a vehicle having a hardtop. Roof elements of the hardtop are movable into a collapsed position in which they rest in a stowage space of the trunk of the vehicle. A trunk lid articulately connected to the vehicle body may be lifted at its front to allow the roof elements to move into and out of the stowage space and may be lifted at its rear to allow items to be loaded into and unloaded out of the trunk.

SUMMARY OF THE INVENTION

An object of the present invention includes a cover for a receiving space in the vehicle body of a vehicle having a collapsible roof with the cover being movable between: a closed position in which the cover covers the receiving space; a roof transport position in which the front end of the cover is lifted to allow the roof to move into and out of the receiving space; and a loading position in which the rear end of the cover is lifted to allow items to be loaded into and unloaded out of the receiving space, in which the cover is implemented with a justifiable expenditure of effort and may be economically manufactured.

In carrying out the above object and other objects, the present invention provides an assembly for use with a cover of a receiving space in the body of a vehicle. The assembly includes first and second guide rod units and a locking lever. The guide rod units are coupled to one another to move together and are connectable to the cover and the vehicle body to movably connect the cover to the vehicle body such that the cover is movable between a closed position in which the cover covers the receiving space, a roof transport position in which the front end of the cover is lifted relative to the receiving space, and a loading position in which the rear end of the cover is lifted relative to the receiving space. The locking lever is connectable to the vehicle body and includes a locking unit which is movable from an engaged position to a disengaged position in response to being actuated. One of the guide rod units cooperates with the locking unit such that the one of the guide rod units is engaged to the locking unit when the locking unit is in its engaged position so that the cover may be moved from its closed position into its loading position and is disengaged from the locking unit when the locking unit is in its disengaged position so that the cover may be moved from its closed position into its roof transport position.

Further, in carrying out the above object and other objects, the present invention provides an associated cover assembly.

In embodiments of the present invention, a cover assembly includes a cover and a rod assembly unit. The cover is for closing a receiving space in the body of a vehicle. A collapsible roof of the vehicle and items such as luggage may be stored in the receiving space. The rod assembly unit movably connects the cover to the vehicle body such that the cover is movable between a closed position in which the cover covers the receiving space; a roof transport position in which the front end of the cover is lifted to allow a collapsible roof of the vehicle to move into and out of the receiving space; and a loading position in which the rear end of the cover is lifted to allow items to be loaded into and unloaded out of the receiving space. The cover is movable from the closed position to either the roof transport position or the loading position in a highly functional manner via the use of the rod assembly unit. In particular, the rod assembly unit includes first and second guide rod units. The guide rod units are multi-bar kinematic linkage systems which may be implemented with structural degrees of freedom in the development of the vehicle. At least one of the guide rod units (preferably the second guide rod unit) cooperates with a first locking unit which is movable between an engaged position and a disengaged position. Depending on the actuation of the first locking unit into either its disengaged position or its engaged position, the cover may be brought into its roof transport position or its loading position.

A locking lever provides operational reliability of a locking unit. The locking lever is a relatively easy manufactured component. An actuating unit is between the locking lever and a control lever. The actuating unit is integratable and functionally efficient by use of convenient means. This also applies for the control element designed as a control bracket, and a second locking unit together with the receptacle and locking pins.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
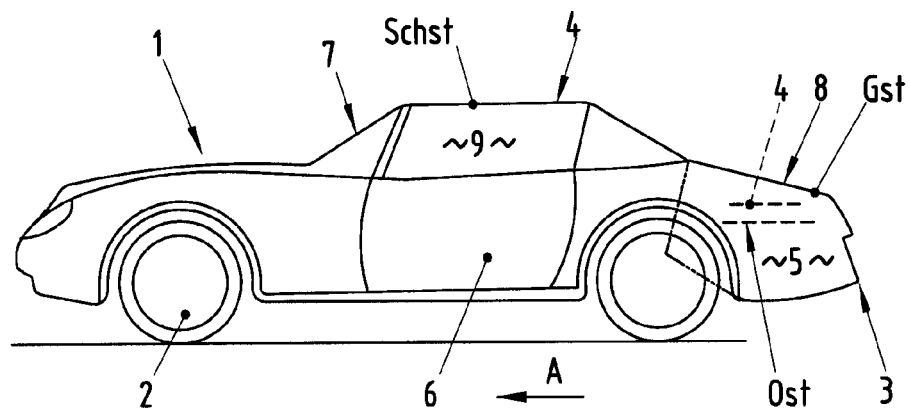
FIG. 1 illustrates a side view of a vehicle in accordance with an embodiment of the present invention.
Figure 2:
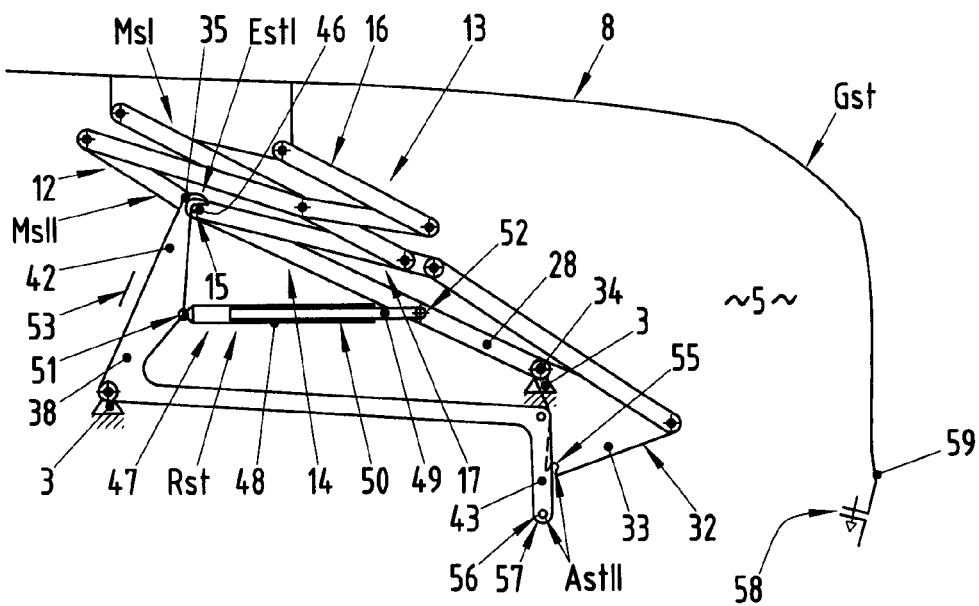
FIG. 2 illustrates a side view of a cover for the receiving space of the vehicle body and a rod assembly unit for moving the cover into either a roof transport position Dst or a loading position Lst in accordance with an embodiment of the present invention with the cover being in a closed position.
Figure 3:
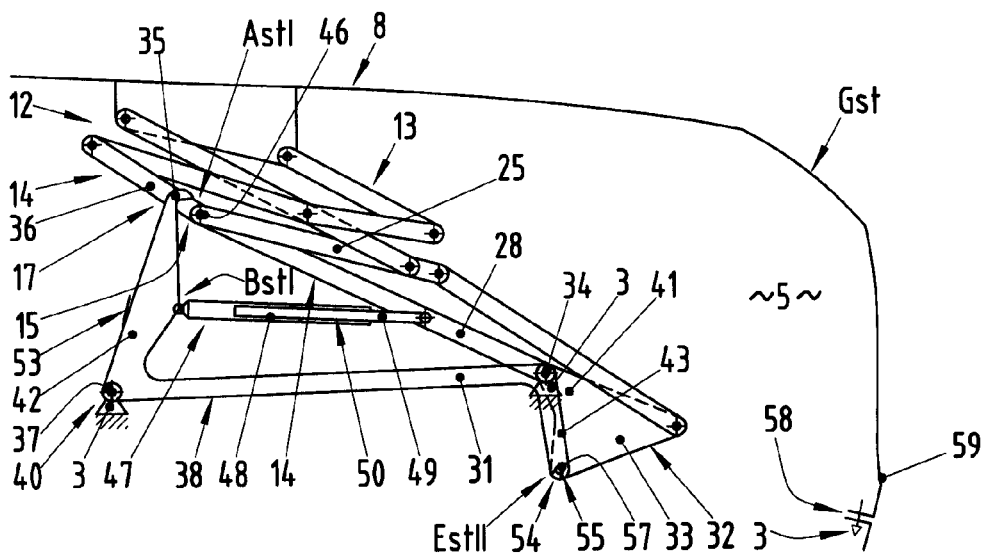
FIG. 3 illustrates a side view of the cover and the rod assembly unit with the cover being in its closed position and the rod assembly unit being in an intermediate position.
Figure 4:
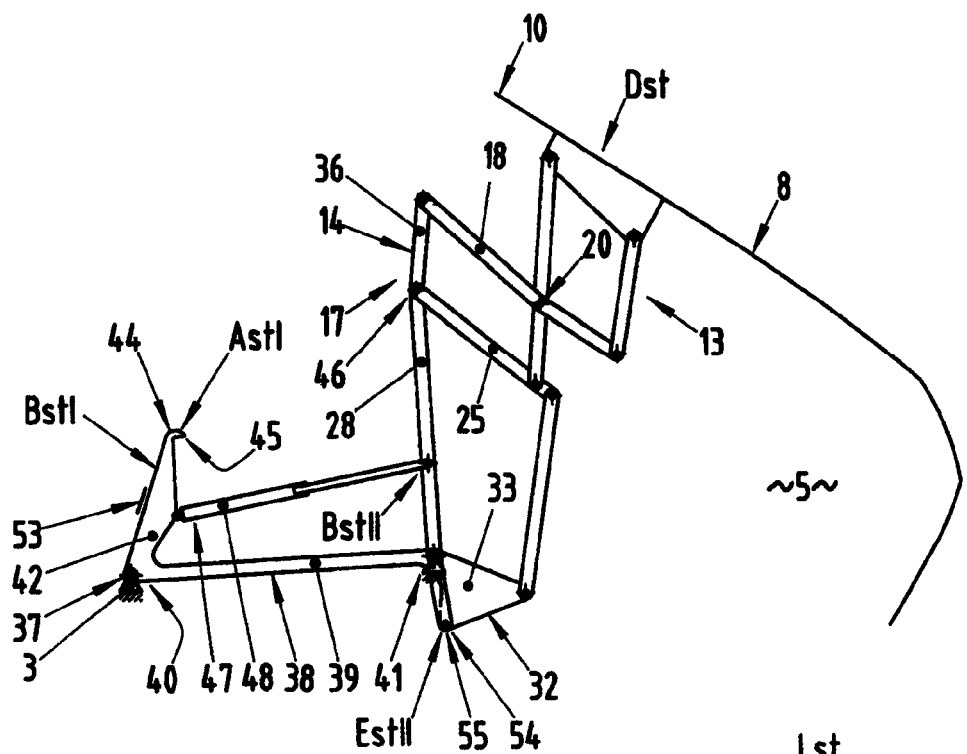
FIG. 4 illustrates a side view of the cover and the rod assembly unit with the cover being in its roof transport position.
Figure 5:
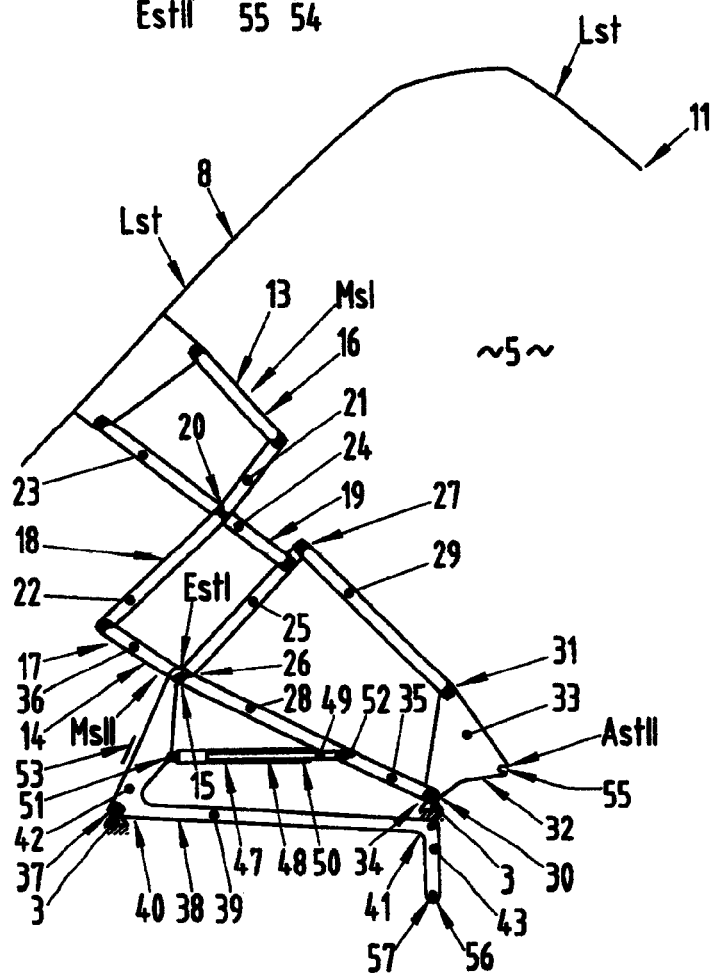
FIG. 5 illustrates a side view of the cover and the rod assembly unit with the cover being in its loading position.

Referring now to FIG. 1, a side view of a vehicle 1 in accordance with an embodiment of the present invention is shown. Vehicle 1 includes a vehicle body 3 supported by wheels 2. Vehicle body 3 includes doors 6 and a windshield 7. The rear end of vehicle body 3 includes a receiving space 5 such as a trunk or a storage compartment.

Vehicle 1 further includes a collapsible or foldable roof 4. Roof 4 is movable between a closed position Schst and an opened position Ost. In the closed position Schst, roof 4 extends over and covers passenger compartment 9 of vehicle 1. In the opened position Ost, roof 4 is collapsed or folded and is stored in receiving space 5.

Referring now to FIGS. 2, 3, 4, and 5, with continual reference to FIG. 1, a cover 8 associated with receiving space 5 is shown. Cover 8 is movably connected to vehicle body 3 to move between: a closed position Gst (shown in FIGS. 1, 2, and 3) in which cover 8 covers receiving space 5; a roof transport position Dst (shown in FIG. 4) in which a front end 10 (viewed in the direction of travel A) of cover 8 is lifted such that cover 8 allows roof 4 to move between its closed position Schst and its opened position Ost (i.e., roof 4 is able to move into and out of receiving space 5); and a loading position Lst (shown in FIG. 5) in which a rear end 11 of cover 8 is lifted such that cover 8 allows items like luggage to be loaded into and unloaded out of receiving space 5 at the rear end of vehicle body 3.

A rod assembly unit 12 movably connects cover 8 to vehicle body 3. Rod assembly unit 12 acts between cover 8 and vehicle body 3 to move cover 8 from its closed position Gst into either its roof transport position Dst or its loading position Lst. Rod assembly unit 12 includes a first guide rod unit 13 and a second guide rod unit 14 which are coupled to one another. Guide rod units 13, 14 are multi-bar kinematic systems MsI and MsII. In particular, first guide rod unit 13 is a first four-bar kinematic linkage assembly 16 and second guide rod unit 14 is a second four-bar kinematic linkage assembly 17.

At least one of guide rod units 13, 14 (preferably, second guide rod unit 14) cooperates with a first locking unit 15. First locking unit 15 may be actuated between an engaged position EstI and a disengaged position AstI. Rod assembly unit 12 is able to move cover 8 from its closed position Gst into its roof transport position Dst as long as first locking unit 15 is in its disengaged position AstI (shown in FIGS. 3 and 4). Conversely, rod assembly unit 12 is able to move cover 8 from its closed position Gst into its loading position Lst as long as first locking unit 15 is in its engaged position EstI (shown in FIGS. 2 and 5).

A first connecting rod 18 and a second connecting rod 19 act between guide rod units 13, 14 and define a common rotational axis 20. First connecting rod 18 together with a first guide rod section 21 forms a guide rod element for first kinematic linkage assembly 16. First connecting rod 18 together with a second guide rod section 22 forms a part of second kinematic linkage assembly 17. Second connecting rod 19 together with a first guide rod section 23 supplements first kinematic linkage assembly 16 and together with a second guide rod section 24 supplements second kinematic linkage assembly 17.

First ends 26, 27 of two inter-spaced first and second control rods 28, 29 engage with a guide rod 25 of second kinematic linkage assembly 17. Second ends 30, 31 of first and second control rods 28, 29 are supported on a control element 32. Control element 32 is a control bracket 33 which is articulately connected to vehicle body 3 via a swivel axis 34. First control rod 28 is an extension of a guide rod 36 of second kinematic linkage assembly 17 and is articulately connected at its second end 30 to swivel axis 34.

First locking unit 15, which is movable between engaged position EstI and disengaged position AstI, includes a locking lever 38. Locking lever 38 is pivotably supported on vehicle body 3 via a connection by a rotary bearing 37. Locking lever 38 includes a horizontally oriented straight support section 39 and end sections 40, 41. Lever sections 42, 43 on end sections 40, 41 of locking lever 38 define angles relative to support section 39 and extend in opposite directions. Lever section 42 extends toward second kinematic linkage assembly 17. Lever section 43 extends on the side facing away from second kinematic linkage assembly 17. Locking lever 38 includes a catch hook 45 on its free side 44. Catch hook 45 cooperates with a pivot bearing 46 used to connect guide rods 25 and 36 of second kinematic linkage assembly 17.

An actuating device 47 is operable to influence locking lever 38. Actuating device 47 includes an actuating cylinder 48 having a piston rod 49 and a housing 50. Actuating cylinder 48 is positioned at one end on locking lever 38 and is positioned at its other end on first control rod 28 via respective articulated joints 51, 52. Actuating cylinder 48 is movable between a neutral position Rst (shown in FIG. 2), a first operating position BstI, and a second operating position BstII. The motion of locking lever 38 (for the first operating position BstI of actuating device 47) is limited by a fixed stop 53. Fixed stop 53 cooperates with lever section 42 of locking lever 38 and is mounted on the side facing away from actuating cylinder 48.

A second locking unit 54 acts between control bracket 33 and locking lever 38 such that control bracket 33 may be affixed to locking lever 38. Second locking unit 54 may thus be moved into an engaged position EstII and a disengaged position AstII. Control bracket 33 includes a fork-shaped receptacle 55 and lever section 43 includes a free end 56 with a locking pin 57. When second locking unit 54 is in its engaged position EstII, control bracket 33 is affixed to lever section 43 as receptacle 55 engages locking pin 57 (see FIG. 4). When second locking unit 54 is in its disengaged position AstII, control bracket 33 is removed from lever section 43 (see FIG. 5).

Movement of cover 8 into its roof transport position Dst is achieved with the following steps. Initially, cover 8 is in its closed position Gst in which cover 8 covers receiving space 5; first locking unit 15 is in its engaged position EstI; and second locking unit 54 is in its disengaged position AstII. In response to the action of pressure from actuating device 47 as actuating cylinder 48 is moved into its first actuating position BstI, first locking unit 15 is unlocked and moves into its disengaged position AstI and locking lever 38 is brought into contact with stop 53. In response to the action of pressure from actuating device 47 as actuating cylinder 48 is then moved into its second actuating position BstII, lever section 42 is moved against stop 54 and second locking unit 54 is moved into its engaged position EstII. Cover 8 is thus moved into its roof transport position Dst in the locked state of second locking unit 54 by actuating device 47.

Movement of cover 8 into its loading position Lst is achieved with the following steps. Initially, cover 8 is in its closed position Gst in which cover 8 covers receiving space 5; first locking unit 15 is in its engaged position EstI; and second locking unit 54 is in its disengaged position AstII. As such, a lock 58 in the rear region of a rear wall 59 of cover 8 (or vehicle body 3) locks cover 8 closed. After lock 58 is unlocked (i.e., opened), either manually or via a motor, rear end 11 of cover 8 may be lifted, either manually or via a motor, until cover 8 is in its loading position Lst. First locking unit 15 remains in its engaged position EstI (i.e., locked position) and second locking unit 54 remains in its disengaged position AstII (i.e., unlocked position).

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An assembly for use with a cover of a receiving space in the body of a vehicle, the assembly comprising:

first and second guide rod units being coupled to one another to move together and being connectable to the cover and the vehicle body to movably connect the cover to the vehicle body such that the cover is movable between a closed position in which the cover covers the receiving space, a roof transport position in which the front end of the cover is lifted relative to the receiving space, and a loading position in which the rear end of the cover is lifted relative to the receiving space;

a locking lever pivotably connectable to the vehicle body via a connection by a rotary bearing, the locking lever having a first locking unit which is movable from an engaged position to a disengaged position in response to being actuated and further having a second locking unit;

first and second inter-spaced control rods: and a control element including a control bracket articulately connected to the vehicle body via a swivel axis, wherein the control bracket is affixable to the locking lever by the second locking unit;

wherein first ends of the control rods engage the second guide rod unit and second ends of the control rods are articulately connected to the control element;

wherein one of the guide rod units cooperates with the first locking unit such that the one of the guide rod units is engaged to the first locking unit when the first locking unit is in its engaged position so that the cover may be moved from its closed position into its loading position and is disengaged from the first locking unit when the first locking unit is in its disengaged position so that the cover may be moved from its closed position into its roof transport position.

2. The assembly of claim 1 wherein:
   each guide rod unit is a multi-bar kinematic linkage system.

3. The assembly of claim 2 wherein: each multi-bar kinematic linkage system is a four-bar kinematic linkage system.

4. The assembly of claim 1 further comprising:
   the guide rod units include first and second connecting rods supported on a common rotational axis.

5. The assembly of claim 4 wherein:
   the first connecting rod together with a first guide rod section forms a guide rod element for the first guide rod unit and together with a second guide rod section forms a guide rod element for the second guide rod unit.

6. The assembly of claim 4 wherein:
   the second connecting rod together with a first guide rod section forms a guide rod element for the first guide rod unit and together with a second guide rod section forms a guide rod element for the second guide rod unit.

7. The assembly of claim 1 wherein:
   the first control rod forms an extension of a guide rod of the second guide rod unit.

8. The assembly of claim 1 wherein:
   the second locking unit has a fork-shaped receptacle and a locking pin by which the control bracket may be locked in an engaged position to the locking lever and unlocked in a disengaged position from the locking lever.

9. The assembly of claim 1 further comprising:
   an actuating unit for actuating the locking units of the locking lever.

10. The assembly of claim 9 wherein:
    the actuating unit includes an actuating cylinder.

11. The assembly of claim 10 wherein:
    the actuating cylinder acts between the locking lever and the first control rod to actuate the locking units of the locking lever.

12. The assembly of claim 1 wherein:
    the locking lever engages with a pivot bearing of the second guide rod unit.

13. The assembly of claim 12 wherein:
    the locking lever has a catch hook which cooperates with the pivot bearing.

14. The assembly of claim 10 wherein:
    when the actuating cylinder is moved into a first operating position the locking lever is supported on a stop.

15. A cover assembly for use with a receiving space in the body of a vehicle, the cover assembly comprising:

a cover;

a rod assembly having first and second guide rod units being coupled to one another to move together and being connectable to the cover and the vehicle body to movably connect the cover to the vehicle body such that the cover is movable between a closed position in which the cover covers the receiving space, a roof transport position in which the front end of the cover is lifted relative to the receiving space, and a loading position in which the rear end of the cover is lifted relative to the receiving space;

a locking lever pivotably connectable to the vehicle body via a connection by a rotary bearing, the locking lever having a first locking unit which is movable from an engaged position to a disengaged position in response to being actuated and further having a second locking unit;

first and second inter-spaced control rods: and a control element including a control bracket articulately connected to the vehicle body via a swivel axis, wherein the control bracket is affixable to the locking lever by the second locking unit;

wherein first ends of the control rods engage the second guide rod unit and second ends of the control rods are articulately connected to the control element;

wherein one of the guide rod units cooperates with the first locking unit such that the one of the guide rod units is engaged to the first locking unit when the first locking unit is in its engaged position so that the cover may be moved from its closed position into its loading position and is disengaged from the first locking unit when the first locking unit is in its disengaged position so that the cover may be moved from its closed position into its roof transport position.

* * * * *